United States Patent [19]
Koide et al.

[11] Patent Number: 4,718,696
[45] Date of Patent: Jan. 12, 1988

[54] RETAINING STRUCTURE FOR WEBBING SECURED TO SEAT OF VEHICLE

[75] Inventors: Teruhiko Koide; Teruhiko Kawaguchi; Hideyuki Suzuki; Tsutomu Muraoka, all of Aichi, Japan

[73] Assignee: Kabushiki Kaisha Tokai-Rika-Denki-Seisakusho, Japan

[21] Appl. No.: 871,831

[22] Filed: Jun. 9, 1986

[30] Foreign Application Priority Data
Jun. 14, 1985 [JP] Japan .................. 60-89677[U]

[51] Int. Cl.⁴ .................. B60G 22/18; B60G 22/02
[52] U.S. Cl. .................. 280/801; 280/807; 297/483
[58] Field of Search .............. 280/801, 808, 805, 806, 280/807; 297/468, 470, 474, 483, 484

[56] References Cited
U.S. PATENT DOCUMENTS

| | | | |
|---|---|---|---|
| 3,032,374 | 5/1962 | Robinson et al. | 297/474 |
| 4,129,321 | 12/1978 | Garvey | 280/805 |
| 4,159,120 | 6/1979 | Föhl | 280/806 |
| 4,236,755 | 12/1980 | Pollitt et al. | 297/468 |
| 4,289,352 | 9/1981 | Ashworth | 280/808 |
| 4,360,171 | 11/1982 | Reid et al. | 280/808 |

FOREIGN PATENT DOCUMENTS 2602875  7/1977  Fed. Rep. of Germany ...... 280/807

Primary Examiner—John J. Love
Assistant Examiner—Karin L. Ferriter
Attorney, Agent, or Firm—Sixbey, Friedman & Leedom

[57] ABSTRACT

A retaining structure for a webbing retained by a seat of a vehicle enables the tension which acts on the webbing to be transmitted to the body of the vehicle so as to be carried thereby. The tension acting on the webbing is carried by the seat and also by a retaining flexible continuous member which is retained by the vehicle body and to which the webbing tension is transmitted. Accordingly, the tension which acts on the webbing when an emergency situation of the vehicle occurs can reliably be transmitted to the vehicle body so as to be carried thereby.

24 Claims, 3 Drawing Figures

RETAINING STRUCTURE FOR WEBBING SECURED TO SEAT OF VEHICLE

BACKGROUND OF THE INVENTION

1. Field of the Invention

The present invention relates to a webbing retaining structure employed in a seatbelt system for a vehicle designed to restrain the body of an occupant in an emergency situation of the vehicle, for the purpose of retaining a webbing secured to a seat of the vehicle.

2. Description of the Related Art

In occupant restraining seatbelt systems for vehicles, it is preferable that an occupant restraining webbing should be in close contact with the body of an occupant at all times and be able to move to an optimum position in accordance with the driving position or posture of the occupant. To meet these requirements, it is desired to secure one end of the webbing to a seat so that, when the occupant adjusts the position of the seat relative to the body of the vehicle in, for example, the longitudinal direction of the vehicle, the webbing is movable in response to the movement of the seat.

However, when the webbing is secured to the seat, the following problems arise. Namely, the seat is subjected to a relatively large tension which is generated in the webbing by the inertia acting on the occupant's body when an emergency situation of the vehicle occurs. Therefore, it is necessary to increase the strength of the seat by a large margin, and this leads to an increase in the weight. In addition, when a shoulder webbing is mounted on a seat, the end of the webbing is secured to the seat back of the seat and since the seat back is supported in a cantilever fashion, that is, the seat back is supported by the seat cushion at one end thereof alone, it is difficult to increase the strength of the seat by a large margin.

To overcome the above-described problems, a reinforcing structure has already been proposed in which the upper end portion of the seat back is secured to the side wall of the vehicle body through a reinforcing member. This prior art structure, however, undesirably allows the seat back to have a large degree of freedom of movement, so that the reinforcement is incomplete.

SUMMARY OF THE INVENTION

In view of the above-described circumstances, it is a primary object of the present invention to provide a webbing retaining structure which is so designed that, even in an arrangement where the webbing is secured to a seat of a vehicle, the tension which acts on the webbing when an emergency situation of the vehicle occurs can reliably transmitted to the body of the vehicle so as to be carried thereby.

To this end, according to the present invention, a webbing which is secured to a seat of a vehicle is supported by the intermediate portion of a reinforcing flexible continuous member which is secured at one end thereof to the side wall of the vehicle body and at the other end to the floor of the vehicle.

By virtue of the above-described arrangement, the webbing can be reliably supported by the retaining continuous member which is secured to the vehicle body at both ends thereof.

DESCRIPTION OF THE PREFERRED EMBODIMENT

Figure 1:
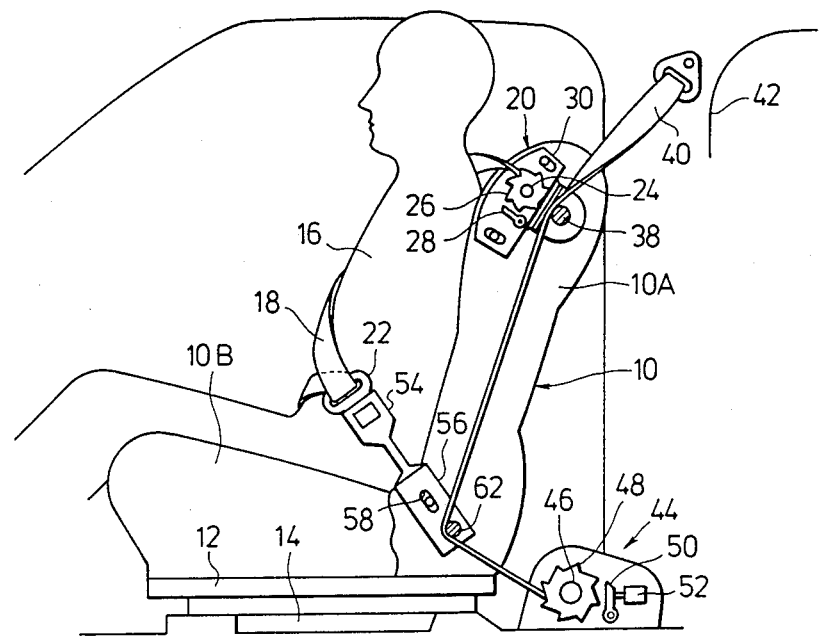
FIG. 1 is a partially-sectioned side view of one embodiment of the present invention.

Referring first to FIG. 1, a seat 10 is mounted on the floor 14 of a vehicle through an adjuster 12, so that an occupant 16 can adjust the position of the seat 10 in the longitudinal direction of the vehicle.

The occupant 16 seated in the seat 10 can fasten an occupant restraining webbing 18. One end of the webbing 18 is wound up into a retractor 20 secured inside a seat back 10A of the seat 10. The intermediate portion of the webbing 18 is passed through a tongue plate 22 so as to be retained thereby. The other end of the webbing 18 is anchored through an anchor plate (not shown) to the side of the seat 10 which is closer to the outside of the vehicle.

The retractor 20 has a take-up shaft 24 for winding up one end of the restraining webbing 18 in layers. The take-up shaft 24 is biased in a direction in which the webbing 18 is wound up by means of the biasing force from a spiral spring.

A ratchet wheel 26 is rigidly secured to the take-up shaft 20, so that, when an emergency situation of the vehicle occurs, a pawl 28 comes in mesh with the ratchet wheel 26 to stop the rotation of the take-up shaft 24 in a direction in which the webbing 18 is unwound. The pawl 28 is actuated by means of an acceleration sensor (not shown).

Figure 2:
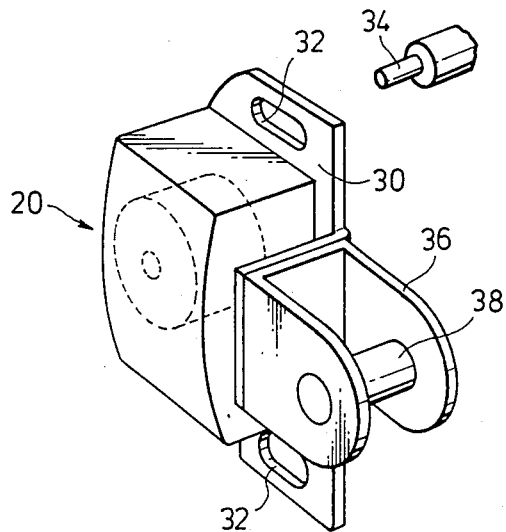
FIG. 2 is an exploded perspective view of one of the retractors employed in the embodiment illustrated in FIG. 1, showing the way in which it is secured to the seat.

Referring next to FIG. 2, the retractor 20 is mounted on a bracket 30 which has guide slots 32 into which are press-fitted pins 34, respectively, which project from the seat back 10A. Thus, when a relatively large external force acts on the bracket 30 through the retractor 20, the bracket 30, together with the retractor 20, can move relative to the pins 32.

A bracket 36 having a U-shaped cross-section is rigidly secured to the bracket 30. A pin 38 is stretched inside the bracket 36, and the intermediate portion of a retaining webbing 40 is passed over this pin 38. The retaining webbing 40 has a smaller width than that of ordinary occupant restraining webbings. The intermediate portion of the reinforcing webbing 40 is adapted to move inside the seat 10, and one end thereof is projected out from the seat back 10A and retained by a center pillar 42 which constitutes a part of the side wall of the vehicle body. The other end of the retaining webbing 40 is wound up into a retractor 44 which is secured to the floor 14 of the vehicle.

The retractor 44 has an arrangement similar to that of the retractor 20. More specifically, the retractor 40 has a take-up shaft 46 adapted to wind up the retaining webbing 40 in layers, and a ratchet wheel 48 is rigidly secured to the take-up shaft 46. A pawl 50 is disposed in opposing relation to the ratchet wheel 48. The pawl 50 is actuated by means of an actuator 52 so as to mesh with the ratchet wheel 48, thereby stopping the rotation of the take-up shaft 46 in a direction in which the retaining webbing 40 is unwound.

The actuator 52 may be activated by an acceleration sensor (not shown), or may be arranged such that the pawl 50 is disengaged from the ratchet wheel 48 only when the occupant effects adjustment of the position of the seat 10 in the longitudinal direction of the vehicle by actuaing the adjuster 12. In a reclining seat structure in which the seat back 10A is pivotable back and forth relative to the seat cushion 10B, the arrangement may be such that the pawl 50 is separated from the ratchet wheel 48 when the occupant adjusts the reclining position of the seat back 10A.

Figure 3:
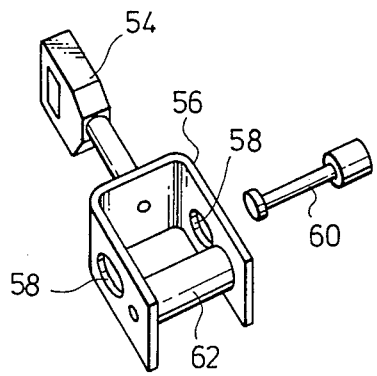
FIG. 3 is an exploded perspective view of the buckle device employed in the embodiment illustrated in FIG. 1, showing the way in which it is secured to the seat.

The tongue plate 22, which is fitted on the intermediate portion of the occupant restraining webbing 18, is adapted to be engaged with a buckle device 54. This buckle device 54 is rigidly secured to a bracket 56 having a U-shaped cross-section (also shown in FIG. 3). Guide slots 58 are provided in the bracket 56, and a pin 60 which projects from the seat 10 is press-fitted into the slots 58 in a manner similar to that in the bracket 36. Therefore, in this bracket 56 also, when the buckle device 54 is subjected to a relatively large load from the restraining webbing 18, the bracket 56, together with the buckle device 54, can move relative to the pin 60.

A pin 62 is stretched inside the U-shaped bracket 56, and the intermediate portion of the retaining webbing 40 is passed over the pin 62.

The following is a description of the operation of this embodiment.

When the occupant 16 seated in the seat 10 engages the tongue plate 22 with the buckle device 54, he is brought into a three-point seatbelt fastened condition as shown in FIG. 1.

In this state, both the retractors 20 and 44 are not locked. Therefore, when the occupant moves the seat 10 in the longitudinal direction of the vehicle by actuating the adjuster 12, the retaining webbing 40 is wound up into or unwound from the retractor 44 in response to the movement of the seat 10, so that the restraining webbing 18 is maintained in close contact with the body of the occupant 16 at all time. In addition, the occupant 16 can asusme any desired driving posture when the vehicle is in a normal state.

When the vehicle runs into an emergency situation, both the retractors 20 and 44 are locked. Therefore, the body of the occupant 16 is reliably restrained by the restraining webbing 18. More specifically, the occupant's body is restrained by the webbing 18 which is tightly fastened to his body, and the tension generated in the webbing 18 by the inertia acting on the occupant's body causes the retractor 20 and the buckle device 54 to move relative to the seat 10, that is, the pins 34 and 60, respectively, in the longitudinal direction of the vehicle. However, since the retaining webbing 40 is passed over the pins 38 and 62 which are respectively secured to the retractor 20 and the buckle device 54, the tension of the restraining webbing 18 is reliably transmitted to the vehicle body through the retaining webbing 40, whereby the restrained condition of the occupant 16 is maintained satifactorily. In addition, since there is no fear of any large load acting on the seat back 10A and the seat cushion 10B, the seat 10 requires no special reinforcement.

It should be noted that the retaining webbing 40 in the above-described embodiment may be replaced with any type of flexible continuous member such as wire.

The present invention, having the above-described arrangement, advantageously enables the load acting on the occupant restraining webbing to be reliably transmitted to the vehicle body so as to be carried even in an arrangement where the the webbing is secured to the seat.

What is claimed is:
1. A retaining structure for webbing secured to a seat of a vehicle, which comprises:
   (a) an occupant restraining webbing wound up by a first retractor, wherein both the retractor and a free end of the webbing are anchored to said seat, and
   (b) a continuous flexible retaining member secured at one end thereof to the side wall of the body of the vehicle and at the other end to the floor of the vehicle body and having an intermediate portion mechanically coupled to the intermediate portion of the webbing,
   whereby, in the event of a vehicular emergency the tension which acts on said webbing is transmitted to the vehicle body.
2. A retaining structure according to claim 1, wherein said first retractor is disposed inside said seat.
3. A retaining structure according to claim 1, wherein said first retractor is rigidly secured to a first bracket which is provided with a guide slot into which is press-fitted a first pin provided on said seat, so that, when a relatively large tension acts on said webbing, said first retractor is movable relative to said pin along said guide slot.
4. A retaining structure according to claim 3, wherein a second bracket having a U-shaped cross section is rigidly secured to said first bracket, said second bracket having a second pin extended therein, the intermediate portion of said continuous member being passed over said second pin, so that, when a relatively large tension acts on said webbing, said tension is carried by said continuous member through first retractor and said first and second brackets.
5. A retaining structure according to claim 4, wherein the other end of said continuous member is wound up into a second retractor which is rigidly secured to the floor of the vehicle body.
6. A retaining structure according to claim 5, wherein the other longitudinal end of said webbing is anchored to said seat through an anchor plate.
7. A retaining structure according to claim 6, wherein said webbing retains at the intermediate portion thereof a tongue plate which is engageable with a buckle device provided on said seat, said buckle device being rigidly secured to a third bracket having a U-shaped cross-section, said third bracket being provided with a slot into which is press-fitted a third pin provided on said seat, said third bracket further having a fourth pin stretched therein, the intermediate portion of said continuous member being passed over said fourth pin, so that, when a relatively large tension acts on said webbing, said tension is carried by said continuous member through said tongue plate, said buckle device and said third bracket.
8. A retaining structure according to claim 7, wherein said continuous member is a retaining webbing having a smaller width than that of said occupant restraining webbing.
9. A retaining structure according to claim 7, wherein said continuous member is wire.
10. A retaining structure employed in a seatbelt system for a vehicle that has a webbing secured onto a seat designed to restrain the body of an occupant, wherein said retaining structure supports said webbing when an emergency situation of the vehicle occurs, comprising:

(a) an occupant restraining webbing anchored at one end thereof to the lower portion of said seat and wound up at the other end into a first retractor which is disposed inside the seat back of said seat; and (b) a buckle device for supporting a folded intermediate portion of the webbing, and (c) a continuous flexible retaining member secured at one end thereof to the side wall of the body of the vehicle and wound up at the other end into a second retractor which is rigidly secured to the floor of the vehicle body, said continuous member being mechanically coupled to the buckle device, whereby the tension which acts on said webbing when an emergency situation of the vehicle occurs is transmitted to the vehicle body.

11. A retaining structure according to claim 10, wherein said first retractor is rigidly secured to a first bracket which is provided with a guide slot into which is press-fitted a first pin provided on said seat, so that, when a relatively large tension acts on said webbing, said first retractor is movable relative to said pin along said guide slot.

12. A retaining structure according to claim 11, wherein a second bracket having a U-shaped cross section is rigidly secured to said first bracket, said second bracket having a second pin stretched therein, the intermediate portion of said continuous member being passed over said second pin, so that, when a relatively large tension acts on said webbing, said tension is carried by said continuous member through first retractor and said first and second brackets.

13. A retaining structure according to claim 12, wherein the other longitudinal end of said webbing is anchored to said seat through an anchor plate.

14. A retaining structure according to claim 13, wherein said webbing retains at the intermediate portion thereof a tongue plate which is engageable with a buckle device provided on said seat, said buckle device being rigidly secured to a third bracket having a U-shaped cross-section, said third bracket being provided with a slot into which is press-fitted a third pin provided on said seat, said third bracket further having a fourth pin stretched therein, the intermediate portion of said continuous member being passed over said fourth pin, so that, when a relatively large tension acts on said webbing, said tension is carried by said continuous member through said tongue plate, said buckle device and said third bracket.

15. A retaining structure according to claim 14, wherein said continuous member is a reinforcing webbing having a smaller width than that of said occupant restraining webbing.

16. A retaining structure according to claim 14, wherein said continuous member is wire.

17. A retaining structure for an occupant restraining webbing secured to a seat of a vehicle, which comprises:

(a) a webbing anchored at one longitudinal end thereof to the side of said seat which is closer to an outside of the vehicle through an anchor plate, and wound up at the other longitudinal end into a first retractor disposed inside the seat back of said seat, an intermediate portion of said webbing being used to restrain the body of an occupant; and (b) a retaining flexible continuous member anchored at one end thereof to a center pillar which constitutes a part of the side wall of the vehicle body, and wound up at the other end into a second retractor which is rigidly secured to the floor of the vehicle body, the intermediate portion of said continuous member being disposed inside said seat back so as to support said webbing, whereby the tension which acts on said webbing when an emergency situation of the vehicle occurs can reliably be transmitted to the vehicle body so as to be carried thereby.

18. A retaining structure according to claim 17, wherein said first retractor is rigidly secured to a first bracket which is provided with a guide slot into which is press-fitted a first pin provided on said seat, so that, when a relatively large tension acts on said webbing, said first retractor is movable relative to said pin along said guide slot.

19. A retaining structure according to claim 18, wherein a second bracket having a U-shaped cross section is rigidly secured to said first bracket, said second bracket having a second pin stretched therein, the intermediate portion of said continuous member being passed over said second pin, so that, when a relatively large tension acts on said webbing, said tension is carried by said continuous member through first retractor an said first and second brackets.

20. A retaining structure according to claim 19, wherein said webbing retains at the intermediate portion thereof a tongue plate which is engageable with a buckle device provided on said seat, said buckle device being rigidly secured to a third bracket having a U-shaped cross-section, said third bracket being provided with a slot into which is press-fitted a third pin provided on said seat, said third bracket further having a fourth pin stretched therein, the intermediate portion of said continuous member being passed over said fourth pin, so that, when a relatively large tension acts on said webbing, said tension is carried by said continuous member through said tongue plate, said buckle device and said third bracket.

21. A retaining structure for webbing secured to a seat of a vehicle, comprising:

(a) an occupant restraining webbing including a first retractor, wherein both the retractor and the free end of the webbing are anchored to the vehicle seat;

(b) buckle means for retaining a folded intermediate portion of the webbing, and (c) a continuous flexible retaining member secured at both ends to the vehicle body and mechanically coupled to both the first retractor and the buckle means, wherein the tension that acts on the webbing in an emergency vehicular situation is transmitted to the continuous member.

22. The structure of claim 21, further including a second retractor for extending and retracting the continuous member whenever the position of the vehicle seat is changed.

23. The structure of claim 22, wherein both the first and second retractors include locking mechanisms that prevent the webbing and the continuous member from unwinding from their respective retractors in an emergency vehicular situation.

24. The structure of claim 23, wherein the continuous member is slidably looped around a portion of both the first retractor and the buckle means.

* * * * *